Oct. 28, 1969   J. M. HIGGINBOTHAM   3,475,148
METHOD AND APPARATUS FOR PRODUCTION OF GLASS FILAMENTS
Original Filed April 19, 1965                              2 Sheets-Sheet INVENTOR.
JAMES M. HIGGINBOTHAM
BY
*Hachin Overman*
ATTORNEYS United States Patent Office 3,475,148
Patented Oct. 28, 1969

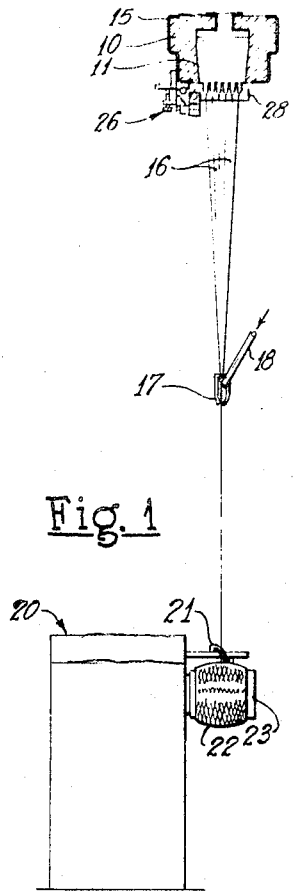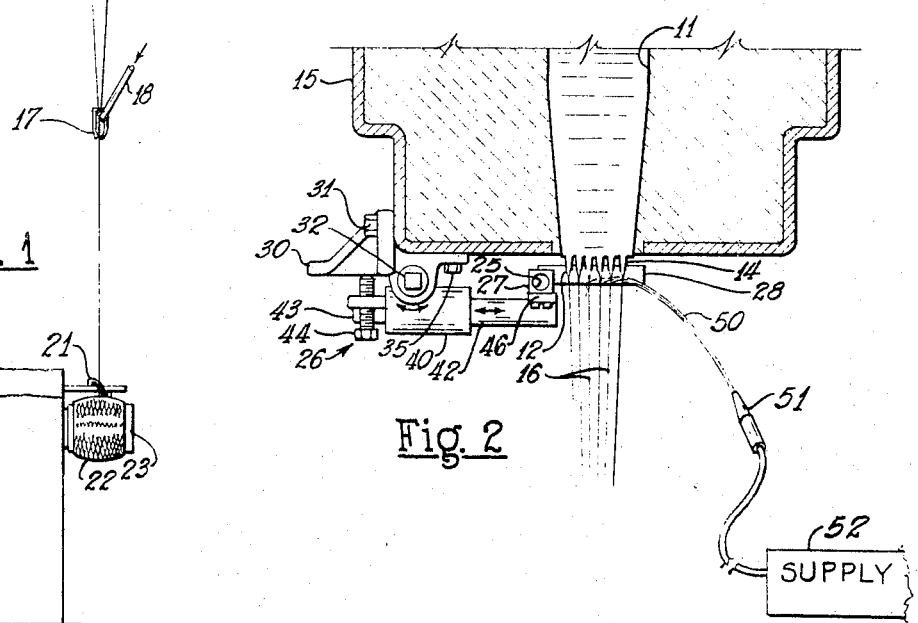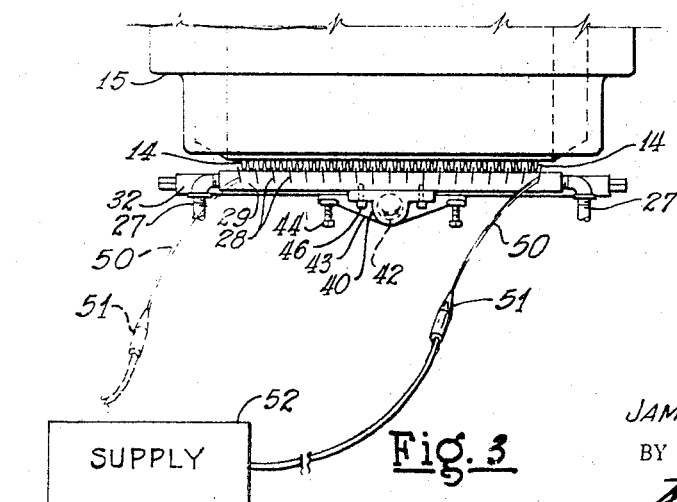

3,475,148
METHOD AND APPARATUS FOR PRODUCTION
OF GLASS FILAMENTS
James M. Higginbotham, Iva, S.C., assignor to Owens-Corning Fiberglas Corporation, a corporation of Delaware
Continuation of application Ser. No. 448,966, Apr. 19, 1965. This application Sept. 26, 1967, Ser. No. 670,810
Int. Cl. C03b 37/02
U.S. Cl. 65—2            8 Claims

ABSTRACT OF THE DISCLOSURE

Method and apparatus for continuously producing glass filaments wherein environmental control means such as fin shields are used adjacent the fiber forming cones. Accumulated wastes are removed from the fin shields by contracting the fin shields and/or accumulated wastes by placing a relatively chilled medium in heat exchange relationship therewith without interrupting the continuous production of filaments.

---

This application is a continuation of application Ser. No. 448,966, filed Apr. 19, 1965, now abandoned.

The invention is described particularly in connection with production of continuous glass fibers wherein streams of molten glass are attenuated mechanically into continous fibers of a small diameter which are then gathered into a strand and wound into a package. Fibers thus produced are then usually processed into other textile forms such as yarns, cords, roving, etc. on conventional textile machinery for subsequent use in ever-widening fields of application.

In greater detail, the process of producing continous fibers of glass to which the present invention relates involves flowing streams of molten glass from orifices of an electrically heated bushing or feeder associated with a container reservoir in which the material is reduced to a molten condition. The orifices are preferably formed in projecting tips or nipples from which heat of the glass is dissipated as it flows in the form of streams therefrom, but may also be formed in the apex of a V-shaped feeder or other structural arrangement such as a flat-plate feeder made of nonwetting alloy. Upon emission to the atmosphere, streams of glass each neck down, as determined by their viscosity and surface tension, to form a cone-like body of the glass from the tip of which a fiber is drawn. Tests indicate that the cohesive forces which transmit the attenuation forces from the fiber to the body of the cone are closely related to the viscosity of the glass. Surface tension of the glass also contributes to the transfer of forces over the periphery of the cone, but, in addition, acts to bring about constriction of the streams into the conical configuration.

Apparatus has been introduced to the art by way of Reissue Patent No. Re. 24,060, issued Sept. 6, 1955; Patent No. 2,908,036, issued Oct. 13, 1959; and Patent No. 3,150,946, issued on Sept. 29, 1964, in which shield members, some of which are water-cooled, are disclosed for disposition immediately adjacent the fiber-forming cones in non-contacting relation with the feeder to absorb heat from the cone by way of radiation absorption and to divide the total number of tips in the respective cones into smaller groups. The shield members shield the environment of the tips and the fiber-forming cones emitted therefrom against extraneous turbulences of the atmosphere outside the zone of fiber formation. The presence of such cooled shield members have made it possible to extend the viscosity range to permit fiberization of glass heated to a higher temperature than could otherwise be fiberized with fluid in an unshielded fiber-forming zone. The fact that the melt can thereby be raised to a high temperature also permits production of fibers of greater uniformity and permits fiberization of glasses which previously were not fiberizable while at the same time making operation conditions less critical to temperature variations due to turbulences in the surrounding atmosphere. By the provisions of cooled shield members in the zone of fiber formation, the rate of cooling of the glass emitted from the feeder is not left to the variant conditions of the atmosphere but provides a greater control of the rate of cooling and makes the conditions of fiber formation more certain.

An additional feature which resulted from the adoption of shield members for fiber-forming operations was the increase in number of rows of tips in a given feeder from which fibers could be attenuated. Previously the number of rows in a given feeder were limited to adjacent rows because if an additional third row were included in the feeder the center row would be so high in temperature from energy radiated to the center row of tips from the outside rows that the glass emitted therefrom would be so fluid as not to allow stable formation of fibers. With the presence of shield members, however, the number of rows could be increased to many more and at the present time eight rows and more of tips in a given feeder have become somewhat of a standard in the art.

While the shield membrs discussed above greatly improve the efficiency of operation and the quality of the product, there have been certain difficulties associated with the use of the shields. As will be discussed in greater detail hereinafter the positioning and initial adjustment of the shields between the rows of projecting tips made from platinum must be most carefully accomplished since the projecting tips may be damaged causing "tip section flooding," wherein the glass forms up and on the outside of the tip and does not form fibers. Further, the shield members must be disposed with some care to provide substantially the same heat transfer relationship between all of the tips and adjacent shield members so that the temperature reduction is more nearly uniform and thus the diameter of the fibers attenuated from the cones is thus also more uniform.

It has been found that in using the shield members that volatiles are formed from the melting and flowing of streams of glass which are accumulated or precipitated onto the shield members as waste. After a certain period of time the fiber-forming station has had to be shut down and the thin shield sections swung away from the feeder and the precipitated or accumulated wastes or volatiles on the shield members must be removed therefrom to avoid interference with the fiber formation and with the uniform reduction of temperature. After this has been accomplished the thin shields must then be redisposed and readjusted with the attendant problems discussed hereinbefore with respect to the initial positioning of the shield members.

It is therefore an object of the present invention to provide an improved method and means for producing fibers from thermoplastic materials.

Another object of this invention is to provide an improved method and apparatus for in-place cleaning of accumulated or precipitated wastes or volatiles from a surface.

It is a still further object of this invention to provide method and apparatus for cleaning precipitated or accumulated wastes from a surface of a heated member having a high coefficient of expansion.

A still further object of this invention is to provide method and apparatus for continuously producing glass fibers which includes steps and means heretofore available in the art but utilizing an additional step or means to accomplish an in-place cleaning of fin shields or temperature reducing means associated with the method or apparatus for continuously producing glass filaments, which eliminates pulling the present fin shield structures down and cleaning them by hand, thereby saving "downtime" and labor. The method and apparatus herein also eliminates "yardage excursions" in which yardage non-uniformities or the yards per pound might be effected because the fiber diameters are not the same if the fins are not placed in exactly the same position previously held before the fin shields were taken down for cleaning. As discussed above this method and apparatus will also reduce the "tip section flooding" through elimination of the tip damage.

The invention features a method for cleaning precipitated or accumulated volatiles from a heated member which comprises a step of placing a chilling fluid in heat-transfer relationship with the heated member. That is, the step advantageously comprises, in this particular disclosure, contracting a heated member having a high coefficient of expansion, so that the heated member sheds accumulated wastes or precipitation from its surface.

More specifically speaking the invention discloses a method for continuously producing glass fibers comprising the steps of melting glass in a container, flowing streams of glass in the form of cones through orifices in one wall of the container, disposing heat sink means in heat-transfer relationship with the cones to rapidly and uniformly reduce the temperature thereof, attenuating the cones into fine filaments, and periodically cleaning accumulated volatiles from the heat sink members by placing a chilled medium in heat-transfer relationship therewith. The cleaning step advantageously includes spraying the heat sink members or means with a fluid at a temperature that is chilled with respect to the temperature of the heat sink members and the volatiles accumulated thereon.

The method further features apparatus for in-place cleaning of accumulated wastes from means for reducing the temperature of cones from which filaments are drawn comprising means for contracting the temperature reducing means. The contracting means advantageously includes means for directing a chilling spray of fluid into heat-transfer relationship with the temperature reducing means.

More specifically there is disclosed herein apparatus for continuously producing glass filaments which comprises a container for molten glass, means for heating the glass in the container, the container having orifices in one wall from which streams of glass in the form of cones are attenuated to fine filaments, means for rapidly and uniformly reducing the temperatures of the streams of glass in the region of the cones, and means for cleaning the accumulated volatiles from the temperature reducing means which includes means for contracting the temperature reducing means without interrupting the production of filaments. The temperature reducing means may include heat sink members adjacent the cones and heat removal means connected to the heat sink members. There is shown herein heat removal means which includes a manifold adapted to conduct a cooling fluid therethrough to carry off heat received from the heat sink members and means for periodically introducing a chilling fluid into the manifold to reduce the temperature of the heat sink members causing them to contract and shed their accumulated volatiles. The temperature reducing means may include hollow heat sink members and the manifold means may be adapted to conduct a cooling fluid to the hollow heat sink members to carry off the heat received. The manifold means may also comprise a first manifold section adapted to conduct fluids to and into the hollow heat sink members and a second manifold section adapted to receive and conduct away fluids from the hollow heat sink members.

Other objects, features and advantages will become readily apparent when the following description is taken in conjunction with the accompanying drawings, in which:

FIGURE 1 is a side-elevational view of a general layout of apparatus including shielding components for production of continuous glass fibers in accordance with the present invention;

FIGURE 2 is an enlarged side-elevational view of the fiber-forming portion of the apparatus of FIGURE 1 showing a first embodiment of the teachings of this invention;

FIGURE 3 is a partial front-elevation view of the apparatus of FIGURE 2;

Figure 4:
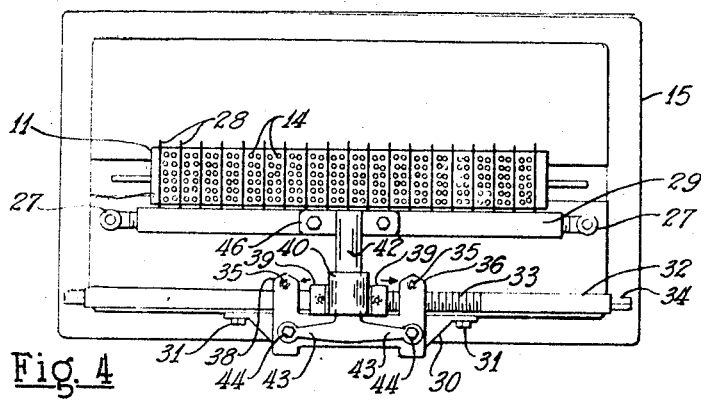
FIGURE 4 is a bottom plan view in part of the apparatus of FIGURE 2 showing the general layout of the feeder section.

Referring now more particularly to the drawings, FIGURE 1 illustrates a refractory furnace 10 for reducing a body of glass to a molten condition having a bushing or feeder 11 associated therewith from which a plurality of streams of glass are emitted from orifices in the feeder tips for attenuation into fibers or filaments 16. The fibers are drawn to a gathering member 17 at which they are gathered and at which sizing fluid is also applied to the fibers as it is supplied from a tube 18 connected to a reservoir not shown. The strand 19 formed of the gathered fibers is packaged by a winder 20 which collects the strand on a tube 22 mounted on a rotating collet 23 and traversed by a suitable traversing device such as a spiral wire traverse 21. The winder provides the force of attenuation for the fibers by reason of rotation of the collet which develops tension in each fiber to withdraw it from the molten glass flowing from the feeder. As is seen more clearly in FIGURES 2, 3 and 4 a cone shielding unit 26 provides a plurality of metal shield members in the form of blade-like fins 28 each extending across the width of the feeder between a pair of rows of feeder tips 14, while each adjacent pair of such members has two rows of tips aligned therebetween. The orientation of the thin blade-like fins 28 across the underpart of the feeder with feeder tips aligned therebetween may be seen more clearly in FIGURES 3 and 4 which illustrates that the tips 14 and the cones 12 emitted therefrom are, in effect, divided in crosswise pairs of rows. The fins 28 extend from a longitudinal hollow cooled manifold or header bar 29 disposed laterally with respect to the feeder structure. Cool water or other coolant is supplied and removed from the header 29 by suitable means such as hoses or conduits 27. Water is fed to one end of the header bar and flows through a hollow channel 25 passing longitudinally through the bar and is emitted from the opposite outlet end at a somewhat higher temperature since upon passage through the header heat is absorbed from the fins.

Where the feeder has more than two rows of tips, such as the six rows of the illustrated embodiment, the shields may be conveniently extended crosswise under the feeder and spaced apart with two rows of tips between each adjacent pair of shields as shown in FIGURE 4. Fins having a thickness in the order of .02 inch to .06 inch have been found to perform satisfactorily as shields. The orifices from which the cones of glass being attenuated emerge may be in the order of .02 inch to .08 inch in diameter with a diameter of .04 inch being a representative size for many forming operations. The space between the crosswise rows of tips within which the fins pass may be made slightly wider than the remaining crosswise rows to more readily accommodate their thickness dimension and also provide greater tolerance for lateral positioning of the shields. The height of the fins 28 is preferred to be such that when in operating position the upper edge of each is at a level slightly above the bottom of the tips with which it is associated while its bottom edge extends downwardly to the level of the apex of the cones emitted from the tip orifices for reasons explained in the above-referenced patents. But by way of example, the upper edge of the fins may be about 1/32 of an inch above the bottom edges of the tips of the feeders, but not in contact with the under surface of the feeder. With such positioning of the upper edge of the fins, their height to provide full length shielding of the cones in some instances need only be in the order of 3/8 of an inch. Thus it can be seen that with the dimensions mentioned which are being dealt with, with respect to the orifices and the shields themselves, that the handling, adjustment, positioning for best uniformity of fiber diameter, etc. is a meticulous and time-consuming task that is repeated many, many times when the fin shields must be pulled down for cleaning by hand. Further, the fin shields themselves are of a dimension that require utmost care when cleaning by hand to avoid bending or other mechanical damage. The invention to be described hereinafter avoids the possibility of damage and non-uniformity in fiber diameter than has heretofore been prevalent.

To facilitate installation of the shielding unit in proper association with the feeder, a typical mounting means with suitable position adjustments is illustrated herein. As shown with greater clarity in FIGURES 2, 3 and 4, the mounting means includes a mounting bracket designed for securement to the side of a jacket 15 of the glass-containing unit 10. The bracket 30 is secured to the side of a jacket by a suitable fastening screw 31 and is more rigidly fixed in position by a second right-angularly related set screw 35 screwed into abutting relationship with the bottom of the jacket. A rotatable support shaft 32 is held in longitudinal parallel relationship with the feeder 11 by a pair of spaced bearing collars 36 and 38, FIGURE 4, fixedly associated with the mounting bracket. The support shaft has a threaded portion 33 arranged for engagement with a corresponding internally threaded section in the collar 36 to permit longitudinal axial positioning of the shaft. A squared end 34 of the shaft 32 permits fitting the crank handle thereto for axial adjustment.

The header or manifold 29 of the shield unit is mounted on a table surface 46 provided on a tilting bracket 42 which in turn is adjustably associated with the pivot bracket 40 mounted on the shaft 32 between the collars 36 and 38. The pivot bracket 40 is positioned along the length of the shaft 32 by a pair of set collars 39 each of which is fixedly associated with a shaft by a set screw. The pivot bracket permits the raising and lowering of the fins 28 about the shaft 32 as a pivot by adjustment of the screws 44 extending in right angular relation through a pair of arms 43 to the under side of the mounting bracket on the side of the shaft 32 opposite to that on which the fins 28 are located.

By this arrangement it will be seen that the fins may be positioned lengthwise and crosswise with respect to the bushing tips and may be adjusted in horizontal level relationship both across the width and length of the feeder as well.

In operation the cone shields stabilize the cones from which the glass fibers are attenuated in a dual sense, namely, (1) by controlling absorption of heat from a glass from emission from the feeder tip and thereby to impart a viscosity to the glass which promotes stability thereto in its fiberization range, and (2) by reducing the disrupting erratic effects of air eddies about the cone as may be caused by both thermal differential conditions and motions of the glass. However, as discussed hereinbefore, volatiles formed in the melting and flowing of the streams of glass through the orifices tend to precipitate or accumulate on the surface of the fin shields, thereby interfering with their temperature reduction characteristics as well as mechanically interfering with the drawing of the filaments of glass. Previously the fin shields were hand cleaned after the fin shield unit was pulled down through the mounting bracket means described hereinbefore, during which time the fiber-forming station was shut down causing a down-time loss on capital investment as well as incurring labor costs for performing the actual hand cleaning of the thin shields. This cleaning operation is required about every eight hours on some fiber-forming stations.

Applicant's invention includes a method and means for cleaning precipitated or accumulated wastes from a surface of a member in general, and particularly for in-place cleaning of accumulated or precipitated wastes or volatiles from fin shields associated with a feeder for producing filaments of heat-softenable material. A first embodiment of the method and means is shown in FIGURES 2 and 3. The fin shield members 28 and thus the accumulated wastes or volatiles thereon are at an exceedingly high temperature. It has been discovered that by directing a chilling fluid into heat-transfer relationship with the fin shields 28 that a contraction is caused which results in the shedding of accumulated wastes or volatiles therefrom. The spraying is accomplished in FIGURES 2 and 3 by a nozzle arrangement 51 connected to a supply 52 of a chilled fluid. The term fluid as used herein is intended to encompass both liquid and gas phases of a fluid. For example, in glass fiber formation the sprayed fluid 50 may comprise water at room temperature which is chilled with respect to the very high temperature of the fin shields 28. By spraying the under side of the fins with water as shown in FIGURES 2 and 3 a chilling of the glaze and/or of the fin members 28 results in the volatiles breaking away from the fin shields. Separation of the volatiles from the fins by use of water in this manner is not effected by the pressure of the water, but rather by the differential in temperature established when the water contacts the fins and accumulated volatiles. That is, a difference in the degree of contraction of the volatiles and the fin metal would appear to be the basis for separation of the accumulated volatiles from the fins. In this regard, it is indicated that the action occurs best when the fins are made from a material having a high coefficient of expansion, e.g. silver.

As a variation of the concept shown in FIGURES 2 and 3 other chilled liquids may be used or a chilled gas, if it can be directed into heat-transfer relationship with the fin shield members 28 in sufficient quantity that the volatiles will be shed by the fins. As a further variation it should be noted that other chilled mediums such as a block of Dry Ice may be pressed against the portions of the fins 28 projecting from between the filaments 16 to provide the drop in temperature required to the volatiles and fins. In effect, the method and means shown herein are directed toward contracting the combined body, including the fin members 28 and the volatiles accumulated thereon, to cause a separation of the accumulated wastes from the fins because the two have a different coefficient of expansion and thus will not contract at the same rate.

It will be noted that the method and means shown herein do not cause an interruption in the continuous production of glass filaments or in any other production where a heated member might be suitably used. The method and means eliminates pulling a fin shield down and cleaning same by hand which saves down-time and labor. The method and means described above eliminates the "yardage excursions" in which yardage non-uniformities occur and the yards per pound may be off because the diameter of the fibers are not the same if the fins are not placed in exactly the same position as previously before the cleaning by hand. Also the reduction of "tip section flooding" is eliminated since the fin shield is not dropped for cleaning and thereafter re-positioned.

Figure 5:
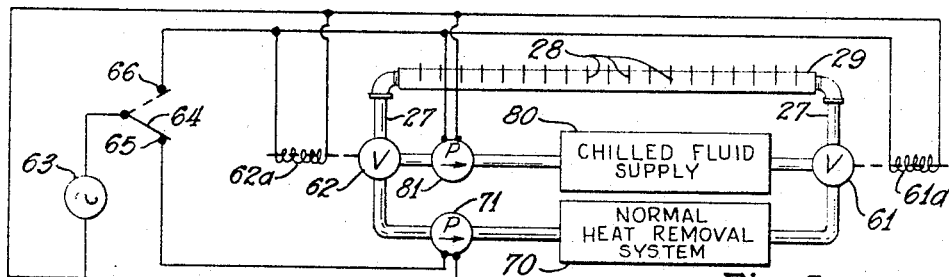
FIGURE 5 is a diagrammatic illustration of a second embodiment of the teachings of this invention.

Referring to FIGURE 5 there is illustrated method and means for accomplishing a second embodiment of this invention in which the same elements already shown in FIGURES 1 through 4 are given identical reference characters. That is fin shield units 28 are mounted in heat-transfer relationship with a header or manifold 29 which is normally supplied va conduits 27 by water or other cooling fluid from the normal heat removal system 70 by a pump 71. A chilled fluid supply 80 with pumping means 81 may be selectively connected to conduits 27 by two-way valves 61 and 62. A source of electrical energy 63 supplies power to pumps 71 and 81 as well as to solenoid actuators 61a and 62a associated with valves 61 and 62 respectively.

In normal operation the two-way valves 61 and 62 are set to conduct fluid from and return fluid to the normal heat removal system 70 via conduits 27 and header or manifold 29. Switch 64 is moved into connection with contact 65 to energize pump 71 for this purpose. If, after a certain period of time such as eight hours or after a predetermined accumulation of volatiles on fin shield members 28, it is desired to remove the volatiles from the temperature-reducing means 28, the switch 64 is removed from connection with contact 65 and placed in connection with contact 66 (as shown in dotted lines in FIGURE 5) to initiate the cleaning cycle. When switch 64 is removed from connection with contact 65, pump 71 is de-energized. When switch 64 connects with contact 66, solenoid coils 61a and 62a are energized to move the valves to a position to shut off the flow through pump 71 and to receive flow from pump 81 and the chilled fluid supply 80 for conduction through conduits 27 to the header or manifold 29 to reduce the temperature of the fin shield members 28. The chilled fluid must in this case be substantially colder than the fluid normally circulated by the heat-removal system 70 since the heat-transfer effect between header or manifold 29 and the fin shield members 28 is less efficient than that attained by directly spraying the fluid onto the surfaces of the fin shield members 28. Although any liquid may be utilized if it may be chilled to a sufficient extent, it may be desired to use a chilled gas such as carbon dioxide or a refrigerating gas which is expanded through one of the valves 61 or 62 into the header 29 which will then act as the evaporator in a refrigerant circulating system. Whatever chilled fluid or medium is utilized it must be of a sufficiently low temperature to cause a substantial temperature drop in the fin shield members 28, or to cause a contraction thereof which will allow the accumulated or precipitated volatiles to be shed from the surfaces of the fin members 28 by the contracting process.

Whenever normal operation again is desired, the switch-blade 64 may be removed from connection with contact 66 and put back into connection with contact 65. The solenoid coils 61a and 62a will be de-energized allowing valves 61 and 62 to shut off flow from chilled fluid supply 80 and permit flow from the normal heat-removal system 70.

Figure 6:
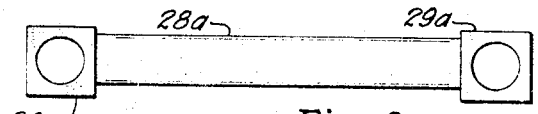
FIGURE 6 is an illustration of a third embodiment of the teachings of this invention.
Figure 7:
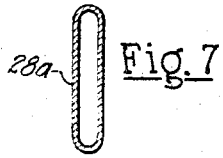
FIGURE 7 is a cross sectional view of a fin shield member illustrated in FIGURE 6.

FIGURE 6 represents a side view of an alternative unit which may be used in FIGURE 5 in which the manifold means comprises a first manifold section 29 and a second manifold section 29a having conduits 25 and 25a formed therein, respectively. The two manifolds are connected by a plurality of hollow fin members 28a, a cross section of one being shown in FIGURE 7. Thus a chilled fluid may be introduced periodically into conduit 25, with flow-through hollow fin members 28a and return to the supply via conduit 25a formed in manifold 29a. This would greatly increase the efficiency of a circulating chilled medium to cause a contraction to shed accumulated precipitates of volatiles from the surfaces of fin members 28a.

Other embodiments are also contemplated to be within the scope of this invention, the details of other fin members suitable therefor being shown in the above-referenced patents. For example, a hollow fin member 28a may easily be substituted in the system shown in FIGURE 5 in which the chilled fluid supply does not flow completely through the hollow fin member 28a but flows through the conduit 25 formed in the header 29 and fills the fin member 28a for more rapid convection cooling by circulation of the fluid. Again it is contemplated in the system shown in FIGURES 5, 6 and 7 that the chilled fluid may be either gas or liquid, an example of the gas being carbon dioxide while an example of the liquid would include water chilled far below that used in the normal heat-removal system.

Therefore, while I have shown certain particular embodiments of my invention, it will, of course, be understood that I do not wish to be limited thereto since many modifications may be made and I contemplate by the disclosure herein to cover all such modifications as fall within the true spirit and scope of my invention.

I claim:

1. A method for producing glass filaments comprising the steps of melting glass in a container, flowing streams of glass in the form of cones through orifices in a wall receiving glass from said container, disposing heat sink members in heat transfer relationship with said cones to rapidly and uniformly reduce the temperature thereof, attenuating said cones into filaments, and placing a medium in heat transfer relationship with said heat sink members that is chilled with respect to the temperature of said heat sink members to remove accumulating volatiles on said heat sink members before the accumulation builds up and interrupts the production of filaments.

2. A method according to claim 1 in which said placing step includes spraying said heat sink members with a fluid at a temperature that is chilled with respect to the temperature of the heat sink members and the volatiles accumulated thereon.

3. A method according to claim 1 in which said placing step includes spraying said heat sink members with water.

4. A method according to claim 1 in which said placing step includes introducing a chilled gas into heat transfer relationship with said heat sink members.

5. A method according to claim 1 in which said placing step includes introducing a chilled liquid into heat transfer relationship with said heat sink members.

6. Apparatus for producing glass filaments comprising a container for molten glass, means for heating the molten glass in said container, said container having orifices in one wall from which streams of glass are attenuated to fine filaments, heat sink members for rapidly and uniformly reducing the temperature of said streams of glass, and means for removing accumulated volatiles from said heat sink members before said accumulation interrupts production including means for introducing a relatively chilled fluid medium into heat transfer relationship with said heat sink members, said chilled medium introduction means including heat removal means connected to said heat sink members, said heat removal means including manifold means for conducting a second fluid therethrough to carry off heat received from said heat sink members, and means for introducing said fluid medium into said manifold means which is chilled with respect to said first fluid when said accumulation is to be removed.

7. Apparatus according to claim 6 in which said heat sink members are hollow and connected to receive fluids from said manifold means.

8. Apparatus according to claim 7 in which said manifold means comprises a first manifold section connected to conduct fluids to and into said hollow heat sink members and a second manifold section connected to receive and conduct away fluids from said hollow heat sink members.

References Cited

UNITED STATES PATENTS

| | | | |
|---|---|---|---|
| 1,191,451 | 7/1916 | Morterud | 134—17 |
| 2,338,165 | 1/1944 | Caugherty. | |
| 3,155,476 | 11/1964 | Drummond | 65—2 XR |

S. LEON BASHORE, Primary Examiner

R. L. LINDSAY, Jr., Assistant Examiner

U.S. Cl. X.R.

65—11, 27; 134—17